US011323868B2

(12) United States Patent
Arkko et al.

(10) Patent No.: US 11,323,868 B2
(45) Date of Patent: May 3, 2022

(54) SERVERLESS CORE NETWORK ARCHITECTURE

(71) Applicant: TELEFONAKTIEBOLAGET LM ERICSSON (PUBL), Stockholm (SE)

(72) Inventors: Jari Arkko, Kauniainen (FI); Ari Keränen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 194 days.

(21) Appl. No.: 16/647,346

(22) PCT Filed: Sep. 17, 2018

(86) PCT No.: PCT/IB2018/057124
§ 371 (c)(1),
(2) Date: Mar. 13, 2020

(87) PCT Pub. No.: WO2019/053682
PCT Pub. Date: Mar. 21, 2019

(65) Prior Publication Data
US 2021/0409931 A1    Dec. 30, 2021

Related U.S. Application Data

(60) Provisional application No. 62/559,000, filed on Sep. 15, 2017.

(51) Int. Cl.
*H04L 41/5054*   (2022.01)
*H04L 67/00*   (2022.01)
(Continued)

(52) U.S. Cl.
CPC .............. *H04W 8/02* (2013.01); *H04L 67/16* (2013.01)

(58) Field of Classification Search
None
See application file for complete search history.

(56) References Cited

U.S. PATENT DOCUMENTS 9,667,509 B1   5/2017 Levi
2007/0202874 A1*  8/2007 Shon .................. H04W 4/06
455/433
(Continued)

FOREIGN PATENT DOCUMENTS

EP   3082295 A1   10/2016

OTHER PUBLICATIONS

3GPP TS 23.501 V1.0.0, 3rd Generation Partnership Project; Technical Specification Group Services and System Aspects; System Architecture for the 5G System; Stage 2, Jun. 2017, 146 pages.
(Continued)

*Primary Examiner* — Ajit Patel

(57) ABSTRACT

Methods for provisioning a service in a first network and providing the service by an entity in a second network are disclosed. The methods comprising maintaining in a software repository in the first network, one or more software images (I1, I2, . . . Ii) of corresponding one or more services and where each service is identified by a service identifier (Si) and storing configuration information related to the one or more services in a database repository of the first network. The method of providing the service in the second network further comprises receiving and storing one or more software images (I1, I2, . . . ) for one or more services of the first network and where each service is identified by a service identifier (Si) and upon detecting a trigger indicating a request for a service of the one or more services, instantiating the software image of the service in the serving network.

9 Claims, 7 Drawing Sheets

(51) Int. Cl.
    *H04W 8/02*         (2009.01)
    *H04L 67/51*        (2022.01)

(56) References Cited

U.S. PATENT DOCUMENTS

| | | | | |
|---|---|---|---|---|
| 2010/0100439 | A1* | 4/2010 | Jutla | G06F 16/958 |
| | | | | 707/741 |
| 2016/0192175 | A1* | 6/2016 | Van Veen | H04L 12/1407 |
| | | | | 455/433 |
| 2017/0141973 | A1 | 5/2017 | Vrzic | |
| 2017/0332226 | A1* | 11/2017 | Bharatia | H04W 8/04 |
| 2019/0141600 | A1* | 5/2019 | Le Guennec | H04W 40/20 |

OTHER PUBLICATIONS

3GPP TS 23.502 V0.4.0 (May 2017), 3rd Generation Partnership Project; Technical Specification Group Services and System Aspects; Procedures for the 5G System; Stage 2 (Release 15), May 2017, 126 pages.

Wikipedia, Network Function Virtualization, https://en.wikipedia.org/wiki/Network_function_virtualization, Sep. 11, 2017, 7 pages.

Wikipedia, Openstack, https://en.wikipedia.org/wiki/OpenStack, Sep. 11, 2017, 18 pages.

Wikipedia, Operating-system-level virtualization, https://en.wikipedia.org/wiki/Operating-system-level_virtualization, Sep. 11, 2017, 3 pages.

Wikipedia, Serverless computing, https://en.wikipedia.org/wiki/Serverless_computing, Sep. 11, 2017, 5 pages.

ISR and Written Opinion from corresponding application PCT/IB2018/057124.

\* cited by examiner

SERVERLESS CORE NETWORK ARCHITECTURE

RELATED APPLICATION

This application claims the benefit of provisional patent application Ser. No. 62/559,000, filed Sep. 15, 2017, the disclosure of which is hereby incorporated herein by reference in its entirety.

TECHNICAL FIELD

This specification relates to service distribution more particularly to service distribution in the Service-Based Architecture (SBA) such as the SBA used in Fifth Generation (5G), core network.

BACKGROUND

The Third Generation Partnership Project (3GPP) is working on 5G, and one of the planned changes it to implement a so-called Service Based Architecture, SBA. This is currently being specified in 3GPP SA2 group, in the 5G core network architecture document 23.501, see overall 5G SBA architecture in FIG. 1A and FIG. 1B (prior art) illustrating the local breakout and the home routing roaming architectures as specified in 3GPP Technical Specification (TS) 23.501 V1.3.0: 3rd Generation Partnership Project; Technical Specification Group Services and System Aspects; System Architecture for the 5G System; Stage 2 (Release 15) and overall 5G procedures: 3GPP TS 23.502 V0.4.0: 3rd Generation Partnership Project; Technical Specification Group Services and System Aspects; Procedures for the 5G System; Stage 2 (Release 15)). The idea behind SBA is that a number of the interfaces and protocols within the core network (including roaming interfaces) are changed from legacy telecom style to more modern, web-based APIs. Additionally, in an SBA representation, network functions (e.g. Access and mobility function, AMF or Session Mobility Function, SMF, see FIG. 1A and FIG. 1B (Prior art)) within the Control Plane enables other authorized network functions to access their services. The details of these "modern" protocols are being worked on, and these details matter as different ways of using web technology will result in large differences in how flexible, easy to secure, future-proof, or efficient 5G core systems will be.

The 5G networks are also expected to run over cloud and virtualization frameworks such as Network Functions Virtualization, NFV. One definition of NFV is provided by the Open Platform for NFV, OPNFV:

"NFV enables complex network functions to be performed on compute nodes in data centers. A network function performed on a compute node is called a Virtualized Network Function (VNF). So that VNFs can behave as a network, NFV also adds the mechanisms to determine how they can be chained together to provide control over traffic within a network."

There are many implementations of NFV. One such implementation is described by OPNFV. OPNFV facilitates the development and evolution of NFV components across various open source ecosystems, such as OpenStack®. OpenStack® is open source software for managing telecommunications infrastructure for NFV, 5G, IoT and business applications.

Several virtualization techniques can be used. For instance, containers allow processes to be isolated from each other and from the underlying framework. As described in Open Network Function Virtualization Forum, OPNFV:

"Containers virtualize the operating system as opposed to the entire machine. As a result, containers are much lighter than virtual machines, but suffer from isolation and security issues by virtue of sharing a common kernel. As an aside, for this reason many users run containers inside virtual machines. Given their small footprint, containers are popular in cloud native micro-services-based software architectures.

Another virtualization technique uses serverless implementations. Serverless computing can be described as a cloud computing execution model in which the cloud provider such as Amazon Web Services, AWS, dynamically manages the allocation of machine resources. Serverless computing allows to build and run applications and services without thinking about provisioning, scaling, and managing any servers.

Serverless computing still requires servers. The name "serverless computing" is used because the server management and capacity planning decisions are completely hidden from the developer or operator. Serverless code can be used in conjunction with code deployed in traditional styles, such as microservices.

More concretely, serverless computing involves services that are not running permanently, but rather are started on demand when some action is required. Once the action completed, the service is stopped, and memory or other resources dedicated to it are returned to the operating system. For some services, if state information is needed, the state is written to either stable storage or stored in a common database service.

SUMMARY

Embodiments described herein describe a serverless Core network that can be applied in the fifth Generation Service Based Architecture or in any environment using Service Based Architecture such as One M2M. The solution can be applied between networks or between a network and a radio access network. The embodiments presented herein share the following elements of the solution:

A distributed implementation of services such that services are only invoked for the duration that they are needed, that they are invoked in the visited network that the user is currently in as opposed to a fixed central location, and that software images associated with each service are pre-distributed to roaming partners in all visited networks.

A mechanism to access data associated with a user or service from the distributed service implementation, such that the data and the software are kept separate, and that e.g., a central storage of a data can be reached from a service instance running in a visited network.

A mechanism to provision service triggers in visited network that enable automatically starting services According to one aspect, a method for provisioning a service in a first network, such as a home network or serving network) is provided. The method comprises the steps of maintaining in a software repository, one or more software images (I1, I2, . . . Ii) of corresponding one or more services and where each service is identified by a service identifier (Si) and storing configuration information related to the one or more services in a database repository of the first network.

In another aspect, the method further comprises the step of publishing to a second network a list of the one or more services. The first network may share roaming agreement with the second network. Or, if the first network is a serving network, then the second network may be a radio access network, such as 5G RAN, interworking with the serving network.

In another aspect, the list of the one or more services comprises associated service description for each service, and the associated service description comprises information related to associated software image and information related to associated service trigger.

In another aspect, the method further comprises maintaining identical software images between the first network and the second network and may also include the step of providing the configuration information related to the one or more services upon request from the second network.

In accordance with one aspect, a method for providing a service by an entity in a serving network (or a second network or RAN) is provided, the method comprises receiving and storing one or more software images (I1, I2, . . . ) for one or more services of a first network and where each service is identified by a service identifier (Si) and upon detecting a trigger indicating a request for a service of the one or more services, instantiating the software image of the service in the serving network.

In another aspect, the method further comprises receiving a list of the one or more service identifiers of home services as published by the first network wherein the list of the one or more services may comprise associated service description for each service, and where the associated service description comprises information related to associated software image and information related to associated service trigger.

In yet another aspect, storing the one or more software images may further comprise applying local modifications to the one or more software images and storing the one or more software images as modified in a local repository. Alternatively, the local modifications comprise adaptation to a special hardware used in the serving network.

In another aspect, the method comprises retrieving from the first network up-to-date configuration data for the instantiated software image of the service and may also comprise removing the software instance for the service once the service as requested is provided.

In one aspect, receiving the one or more software images is in response to sending a request to a software repository wherein the request is sent to an address provided in the information related to the associated software image published by the first network.

In accordance with one aspect, an apparatus is provided for performing the embodiments of the method in the first network.

In accordance with another aspect an apparatus is provided for performing embodiments of the method in the second network.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1A:
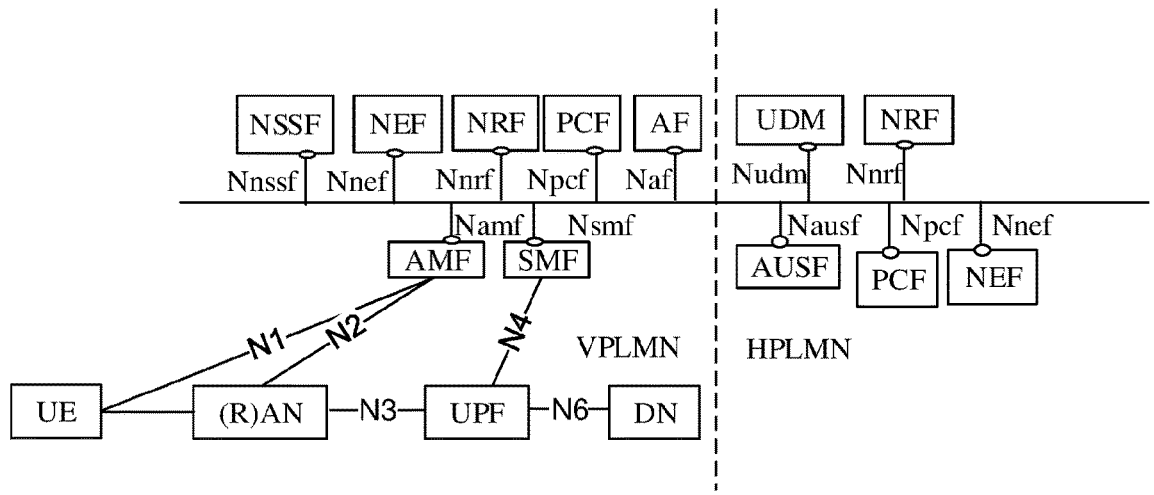
FIG. 1A and FIG. 1B (Prior art) illustrates example two 5G 3GPP Service based architecture for a local breakout scenario and a home routing scenario respectively.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments in this disclosure relate to 5G core networks but, is also applicable in a more general case of any networks consisting of a "visited" network and a "home" network, also referred to a visited public Land Mobile Network, VPLMN and a home, HPLMN. In an embodiment, the term "serving" network is used to refer to the network where the UE is connected and where the service is provided to the UE. The serving network may be a visited network or a home network depending on whether the UE is roaming or not. The service provided to the UE in the serving network may be a home service instantiated at the serving network when the serving network is a visited network. The networks may also consist of a "Network Access Server" and a "central control point.", or a "client" and a "server". The central idea of this disclosure also extends beyond the core network, into various control aspects in the Radio Access Network (RAN).

Figure 1B:
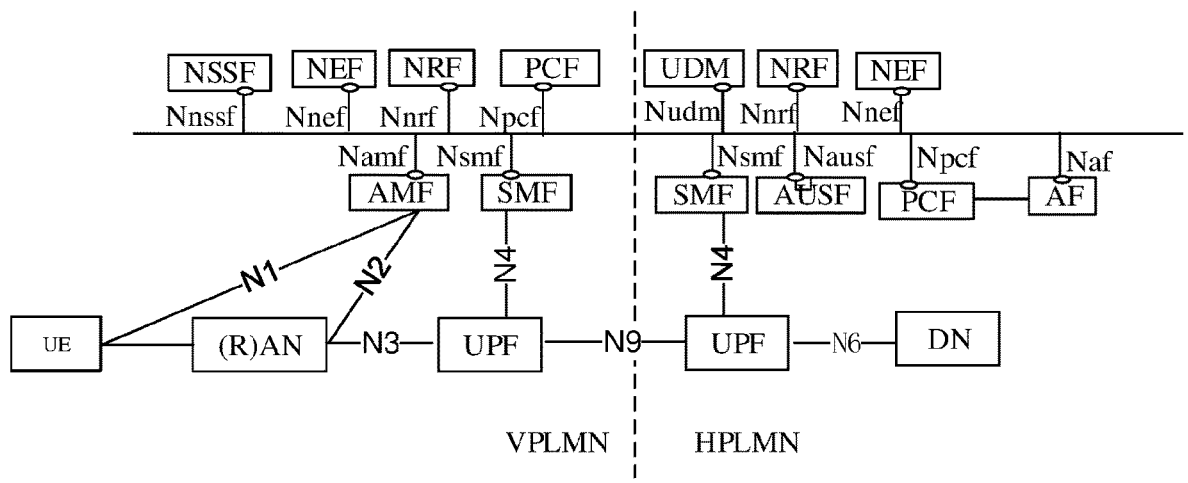

Current networks, such as for example 3GPP Evolved Packet Core used with 4G radio access network and specified in 3GPP TS 23.401 operate largely based on continuously running services on servers, e.g., Authentication, Authorization and Accounting, AAA servers, proxy servers, Mobility management servers, address assignment servers such as DHCP and routing nodes such as Serving gateway, SGW, Packet gateway nodes, PGW, etc. This may usually consume more resources than is necessary. Similar services are also required in the new Service based architecture, SBA, of the 5G core network specified in 3GPP TS 23.501 and illustrated in FIG. 1 for the roaming SBA architecture.

Additionally, current networks (4G or 5G, or similar) have many services that are provided in the home network, and just routing the necessary signaling traffic from a visited network to the home network can be challenging at times. For instance, complex AAA systems are needed to manage the necessary relationships, and various intermediate services that are needed when requesting something from the home network can cause delay in message processing.

This specification describes embodiments of using serverless style implementation of some of these Core network services more specifically 5G Core network services by pre-distributing software images of the services to the roaming partners and instantiating the service in the roaming/visited network on a need basis. By doing so, unnecessary resource usage should be eliminated, idle capacity should be reduced if not eliminated, services scale more efficiently and service fulfillment would be allowed to happen closer to the actual end user, e.g., in the visited network. In other words, services can execute close to the user's actual location, and provide quick round-trip times and responsiveness.

The services are defined by the home operator, and when instantiated at the visited (or roaming) network, the software is run for the home operator. Additionally, pre-distribution of software images for the services to the roaming network enables quick launch of services compared to downloading them dynamically during the start of a session.

Database entries for the optional state information associated to the service allow the minimal amount of data necessary to be shared between networks or operator's networks. Additionally, changes to the database entries are handled efficiently as needed.

In summary, the following aspects of the solution proposed in the embodiments herein comprise:

A distributed implementation of services such that services are only invoked for the duration that they are needed, that they are invoked in the visited network that the user is currently in as opposed to a fixed central location, and that software images associated with each service are pre-distributed to roaming partners in all visited networks.

A mechanism to access data associated with a user or service from the distributed service implementation, such that the data and the software are kept separate, and that e.g., a central storage of a data can be reached from a service instance running in a visited network.

A mechanism to provision service triggers in visited network that enable automatically starting services.

Example of 5G Services that can be Instantiated

The following is a non-exhaustive list of home services that are planned to be offered in the 5G core network as specified in 3GPP which could be instantiated in the visited network:

Session management
Dynamic Host Control Protocol, DHCP
Authentication
User Plane function
Policy control
Constrained Application Protocol, CoAP, multicast service discovery service
Lawful intercept
Non 3GPP interworking server
Proxy call session control function Embodiments of this specification relate to roaming situations where the same user roams into many different visited networks over time.

Embodiments also apply to a more general case of any access networks consisting of a "visited" network and a "home network", or even a "Network Access Server" and a "central control point". Embodiments described herein may also be applicable in various control aspects in the Radio Access Network, RAN. The embodiments herein are described for UEs roaming a "visited network" and the need to access services of the "home network".

In an aspect, a system method is provided where serverless computing is used to instantiate services (home services) on a need basis in a roaming network (visited network), the method comprises the following components:

splitting each service into software that can provide the service (common part and customized part), and associated optional database entry for the state information that is needed for some services.

Distributing the software parts to roaming partners.

Launching the software for a given service, when needed, at the visited network.

Enabling access to the database entry from the software instance at a visited network.

As previously indicated, the services could also be instantiated in a radio access network by the core network, in which case the method comprises the following components:

splitting each service into software that can provide the service (common part and customized part) and associated optional database entry for the state information that is needed for some services.

Distributing the software parts to Radio Access Network, RAN.

Launching the software for a given service, when needed, at the RAN.

Enabling access to the database entry from the software instance at the RAN.

Figure 2:
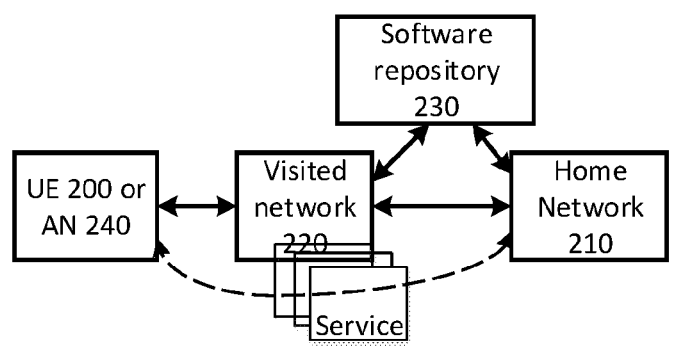
FIG. 2 illustrate components of a serverless SBA according to an embodiment.

FIG. 2 illustrates the components of a serverless service based architecture that can apply to a 3GPP 5G Core network or to other SBA networks in a roaming use case (visited network and home network) in accordance with one embodiment.

Services running using serverless computing (or serverless method) consist of a software image of the service and an associated optional database for storage of any data that might be needed to store state or configuration information for the service. The software images can be standardized software image formats for a given platform, e.g., containers are one way to represent the software.

FIG. 2 further illustrates distribution of at least one software image from a home operator network 210 to its roaming partners, i.e., visited network 220. Only one visited network 220 is illustrated in FIG. 2, but the home network can distribute to multiple visited networks 220 at a time. Each roaming/visited network 220 can maintain a directory of these images and can acquire updates in some fashion.

One simple way to do this would be to run a file synchronization method such as well-known remote synchronization (rsync), but obviously more advanced methods, such as Docker Hub, can also be used.

As previously stated, the service consists of a software image and an optional database. The software image further consists of a base (shared by all/most users of the system, i.e., all networks including home and visited networks) and optional operator specific layers. The operator specific layers can contain extensions or modifications to the executable code that provides the service. For example, base image could be a minimalistic HTTP server and operator specific addition would consist of the Python runtime and audio processing codec. Using this system, the base image would be pre-provisioned in all visited operators network 220. Additional layers would be applied as a need for them is detected (e.g., a roaming agreement is established).

Furthermore, the visited network 220 would be able to access the relevant database entries from the home network 210. Various well-known methods could be used to allow the visited network 220 to access the database in the home network 210. Some of those methods include but are not limited to:
distributed databases,
centralized data storage at the home operator network 210, Whatever method is used to access the database, the necessary keys and information needed to access the database can be directly embedded in the software images, for example as part of the operator specific layers.

Once these prerequisite steps are in place, the visited network 220 can launch services as needed in serverless fashion, i.e., by launching the software image as a new container when a predefined event happens. The service runs in the visited network 220 as if it was executing in the home network 210. For instance, if the service is about IP address management, the arrival of a DHCP packet may trigger the starting of the IP address management service. The DHCP server instance can then contact anything else that is needed for its execution, e.g., reach out to its corresponding database in the home network 210 as needed.

Figure 3:
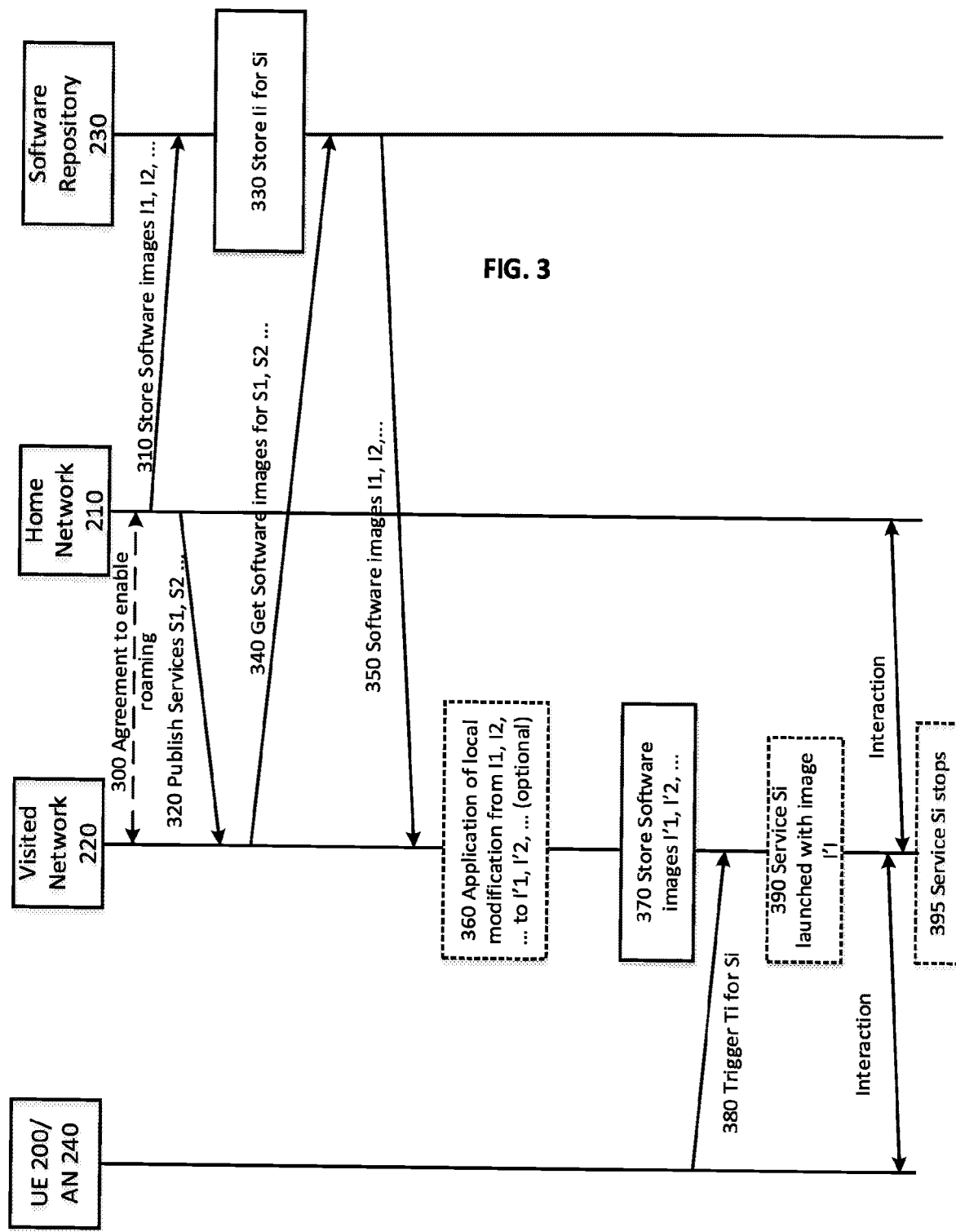
FIG. 3 illustrates a message flow of service provisioning and execution in accordance with an embodiment.

FIG. 3 illustrates a message flow for service provisioning from the home network 210 to the serving network 220 and service instantiation and execution in the visited network 220 in accordance with an embodiment.

Example of services are described above. Referring to FIG. 3, the service provisioning and the service instantiation occur at different times independently of each other. Service provisioning may of course be performed when the service is triggered by the serving network, but that might introduce delays in execution and delivery of the service. In the embodiment illustrated in FIG. 3 for a roaming scenario, provisioning is performed independently of the service instantiation.

Service Provisioning

To enable serverless roaming, the home operator network 210 and roaming operator network 220 first establish roaming agreement shown at step 300. Roaming agreements enable the home network 210 to publish services to a visited network 220. If the home network 210 and the visited network 220 are 5G core network, see above for a possible list of services published by the home network 210. At step 310, the home network 210 stores software images that are used by the services to a software repository 230. At step 330, the repository 230 stores the images and associated service identifiers (Si). The software repository 230 can be operator specific or shared by a set of operators in which case the repository 230 may be maintained outside the home operator 210. At step 320, the home operator network 210 publishes a set of services to the visited network 220 and may include the service description. The service description consists of information of the associated software image (Ii) and service trigger (Ti).

At steps 340 and 350, the visited network 220 retrieves the software images from the software repository 230. The visited network 220 may already have some of the software images (Ii) due to earlier installations of the services. The service identifiers (Si) are globally unique but re-usable (e.g., same version of DHCP server can be identified with same identifier Si across operators). If the visited network 220 requires local modifications to the software images (Ii) (e.g., adaptation to specific hardware) these are applied in the optional step 360. The software images (Ii) and the associated triggers (Ti) are stored in the visited network 220 at step 370.

In an embodiment, if the user is non-roaming (i.e., user is @home) or the user is roaming but requesting services of the visited network 220, e.g., location-based services), the services provided by the network to which the user is directly connected (i.e., home or visited) may be instantiated on a need basis within that network. In this case, the software images of the services will already be stored in the same network where the service is instantiated and the service provisioning steps 300 and 320 of FIG. 3 from the home network 210 to the visited network 220 will be omitted.

Service Triggering

At step 380, when a trigger event is detected, the visited network 220 launches the associated service as shown in step 390 using the associated software image. The service can potentially retrieve from home network (database) up-to-date. The trigger may be initiated by an access network 240 (e.g., a base station) a UE 200 or and/or a network entity in the visited network 220. The access network 240 and/or UE 200 can interact with the service instantiated in the visited network 220 and can interact with the home network 220 using the service. When the interaction is over, the service is stopped at step 395 and the resources are released.

There can be various kind of triggers for each service. The events triggering the instantiation of the service may be detected through IP packet inspection or through explicit messages received from the UE 200, or messages received at the access network 240 or at a network entity in the visited network 220. The following are examples of such triggers:
1. A protocol message, such as Dynamic Host Control Protocol, DHCP, message, can trigger instantiation of a DHCP server. One embodiment to detect this kind of event is by inspecting the used 5-tuple (source and destination address, -port, and transport protocol).
2. A Constrained Application Protocol, CoAP, multicast service discovery message may trigger instantiation of a CoAP Resource Directory service. The COAP service discovery message may contain specific options indicating what kind of service is requested and hence a rule that allows understanding CoAP messages may be needed and may be provided with the provisioning information.
3. A mobility event may result in instantiation of a
   a. local Mobility Management Entity or,
   b. a local Mobility Management and a session management entity (e.g., AMF and/or an SMF) or, c. a session management entity (e.g., SMF)
4. This kind of event would not be detected by IP packet inspection but from an explicit message received from the UE 200, at the access network 240 or at an entity in the visited network 220.
5. An authentication event may result in instantiation of an authentication server (e.g., AUSF). This kind of event would not be triggered by IP packet but from an explicit message received from the UE 200, at the access network 240 or at an entity in the visited network 220.
6. A policy event may result in instantiation of a policy server (e.g., PCF).

When the service is instantiated in the visited network, it is executed as if it is executed in the home network 210.

Figure 4A:
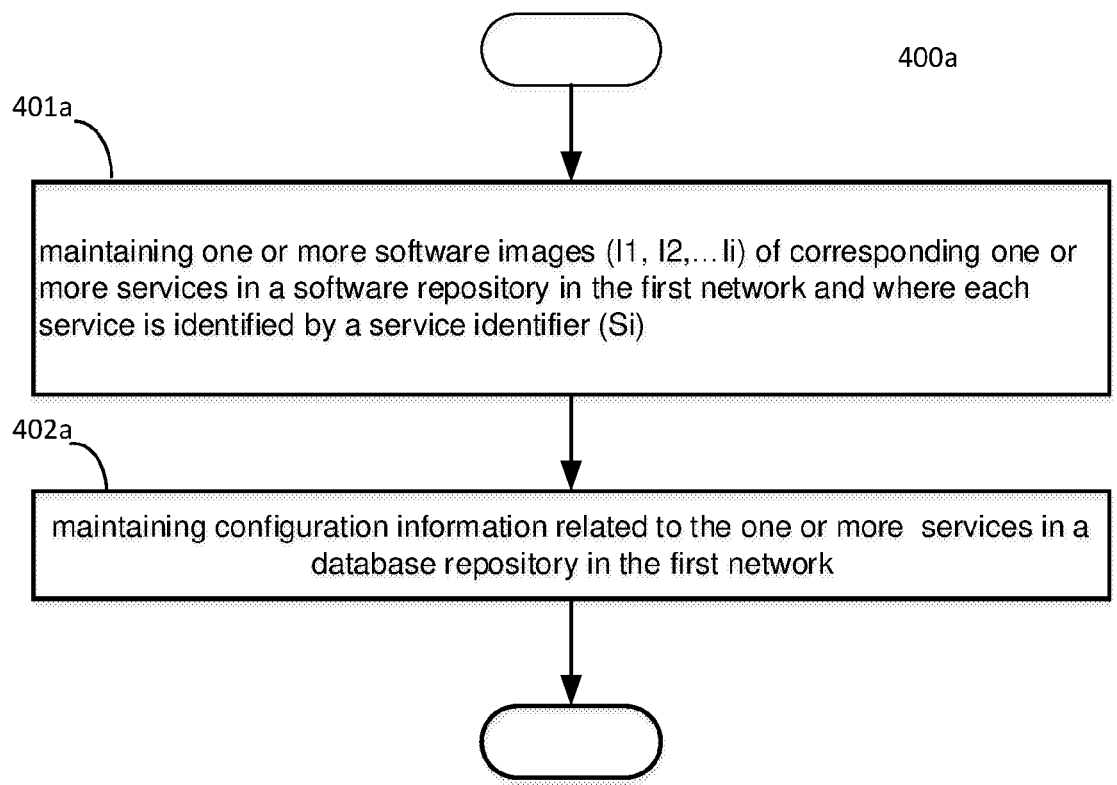
FIG. 4a is a flow chart illustrating a method of provisioning of software image of a service from a home service to a visited network as executed by an entity in the home network in accordance with one embodiment.

FIG. 4a is a flow chart illustrating a method 400a of provisioning of a software image of a service from a home service to a visited network as executed by the home network in accordance with one embodiment. This method may be executed by one or more entities in the home network. The steps presented herein may be executed by different entities of the home network or by one entity comprising various functions. An example of an entity may be a Network function repository function, NRF, as specified in 5G Core network of 3GPP but enhanced to support the embodiments herein. Other entities may also be used.

The method 400a comprises the step 401a of maintaining in a software repository one or more software images (I1, I2, . . . Ii) of corresponding one or more services and where each service is identified by a service identifier (Si). The software images consist of two parts: the base (shared by all/most users of the system) and optional operator specific layers. The operator specific layers can contain extensions or modifications to the executable code that provides the service. For example, base image could be a minimalistic HTTP server and operator specific addition would add their Python runtime and audio processing codec. The base images would be pre-provisioned to all operators using this system and additional layers would be applied when need for them is detected (e.g., a roaming agreement is established).

The software repository may be maintained by the home network or may be maintained externally in which case it may be shared by many operator's networks. In addition, at step 402a the entity in the home network executes the step of storing the data required to configure a software image of a service in a separate database in the home network.

In the embodiment involving a home and a visited network, the home network maintains roaming agreements with one or more visited networks.

A list of services available or provided by the home network for its users may be published. A service description associated with a published service may be included in the publishing step if executed. The service description for each service comprises information of associated software image such as the address of the Software repository where the software image is stored, and information related to associated service trigger.

Following the publication of the services, if the software repository is maintained by the home network, the software repository and perhaps via the entity in the home network, may receive a request from a visited network for one or more software images for one or more services identified by the service identifier S1, S2, . . . Si. The home network provides the requested one or more software images (I1, I2, . . . Ii) to the visited network, in particular to the requesting entity in the visited network.

When a software image is distributed to one or more visited network, a synchronization scheme must be maintained, so any changes to the software image must result in updating the distributed copy. Mechanisms such as rsync, Docker Hub and the likes can be used.

In an embodiment, an entity in the home network provides the configuration information related to the one or more services upon request from the visited network. This would be the case if a particular service is instantiated at the visited network.

Figure 4B:
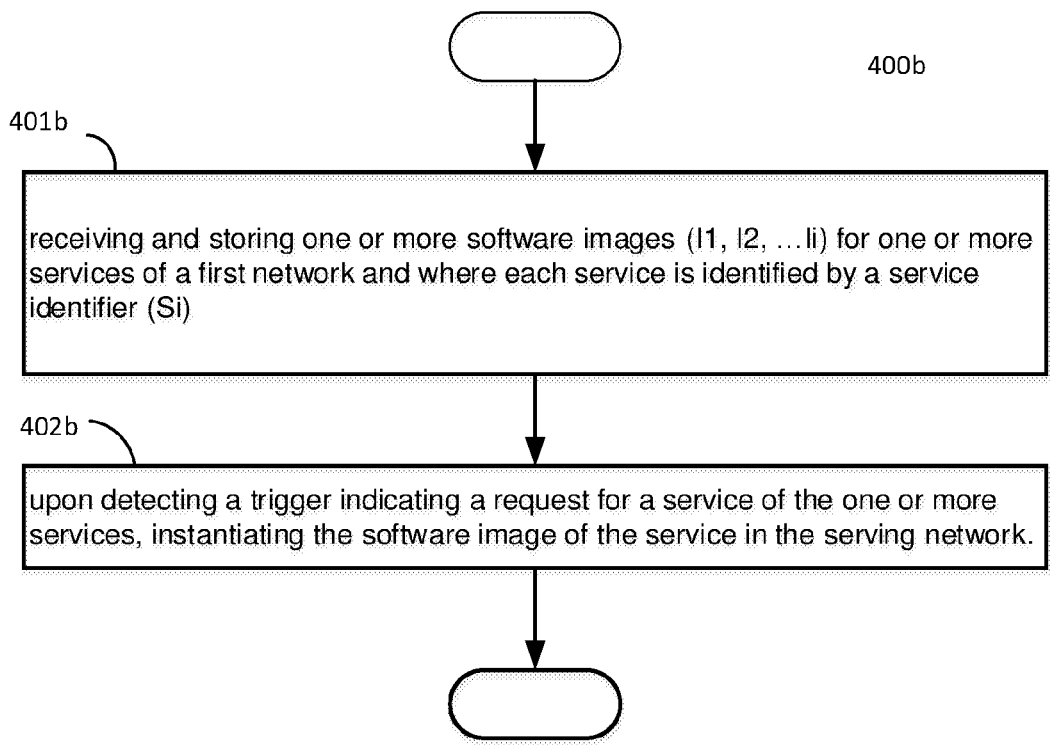
FIG. 4b is a flow chart illustrating a method of instantiating a home service in a visited network as executed by an entity in the visited network in accordance with one embodiment.

FIG. 4b is a flow chart illustrating a method 400b of instantiating a home service in a visited network in accordance with one embodiment. This method may be executed by one or more entities in the visited network. The following steps may be executed by different entities of the visited network or by one entity comprising various functions. An example of an entity may be a Network function repository function, NRF, as specified in 5G Core network of 3GPP but enhanced to support the embodiments herein. Other entities may also be used.

The method 400b comprises the step 401b of receiving and storing one or more software images (I1, I2, . . . ) for one or more services of a first network and where each service is identified by a service identifier (Si). The one or more software images are received in response to sending a request to the software repository. The address of the software repository may be configured in the visited network entity or received by the home network. If the visited network entity received a published list of the one or more service identifiers identifying the home services that can be provided to a user roaming in that visited network, the received service publication may include the associated service description for each service. The service description may comprise information related to the associated software image and information related to associated service triggers. The address information of the software repository from where to retrieve the software images of the home network may be included in the associated service description information. The retrieval of the software images can be triggered by establishment of the roaming agreements or upon receiving the service publication by the home network.

After receiving the software images, the entity in the visited network may execute the step of applying local modifications to the received software images such as adaptation to specific hardware adaptation and store the modified software images I'1, I'2 . . . to a local software repository. If no local modification is required, it stores the software images I1, I2, . . . as received from the home network. The service triggers for instantiating the software image of the service are also stored locally.

At step 402b, upon detecting by an entity in the visited network a trigger indicating a request for a service in the home network but for which a software image is available, instantiating the software image of the service in the visited network. Once instantiated, the entity may execute the step of retrieving from the home network up-to-date configuration data for the instantiated software image of the service. Once the software image of the service is configured, it provides the service as if it was provided by the home network. Once the service is provided, the instantiation is removed, hence preventing the associated resources from idling.

Figure 5:
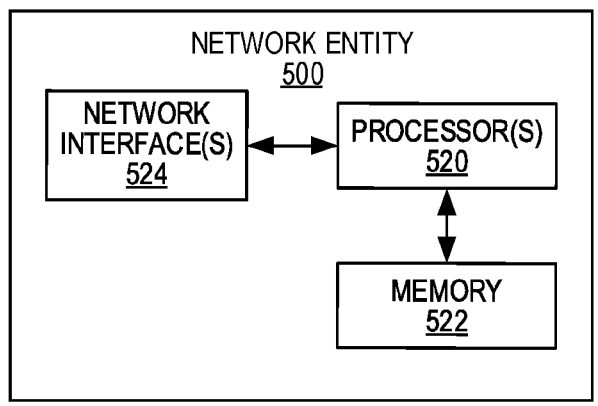
FIGS. 5 through 7 illustrate example embodiments of a network entity in the home network or the visited network in accordance with some embodiments.

FIG. 5 is a schematic block diagram of a network entity 500 in a first network or second network or serving network according to some embodiments of the present disclosure. As illustrated, the network entity 500 includes one or more processors 520 (e.g., Central Processing Units (CPUs), Application Specific Integrated Circuits (ASICs), Digital Signal Processors (DSPs), Field Programmable Gate Arrays (FPGAs), and/or the like), memory 522, and a network interface(s) 524. In some embodiments, the functionality of the network node 500 described above may be fully or partially implemented in software that is, e.g., stored in the memory 522 and executed by the processor(s) 520.

Figure 6:
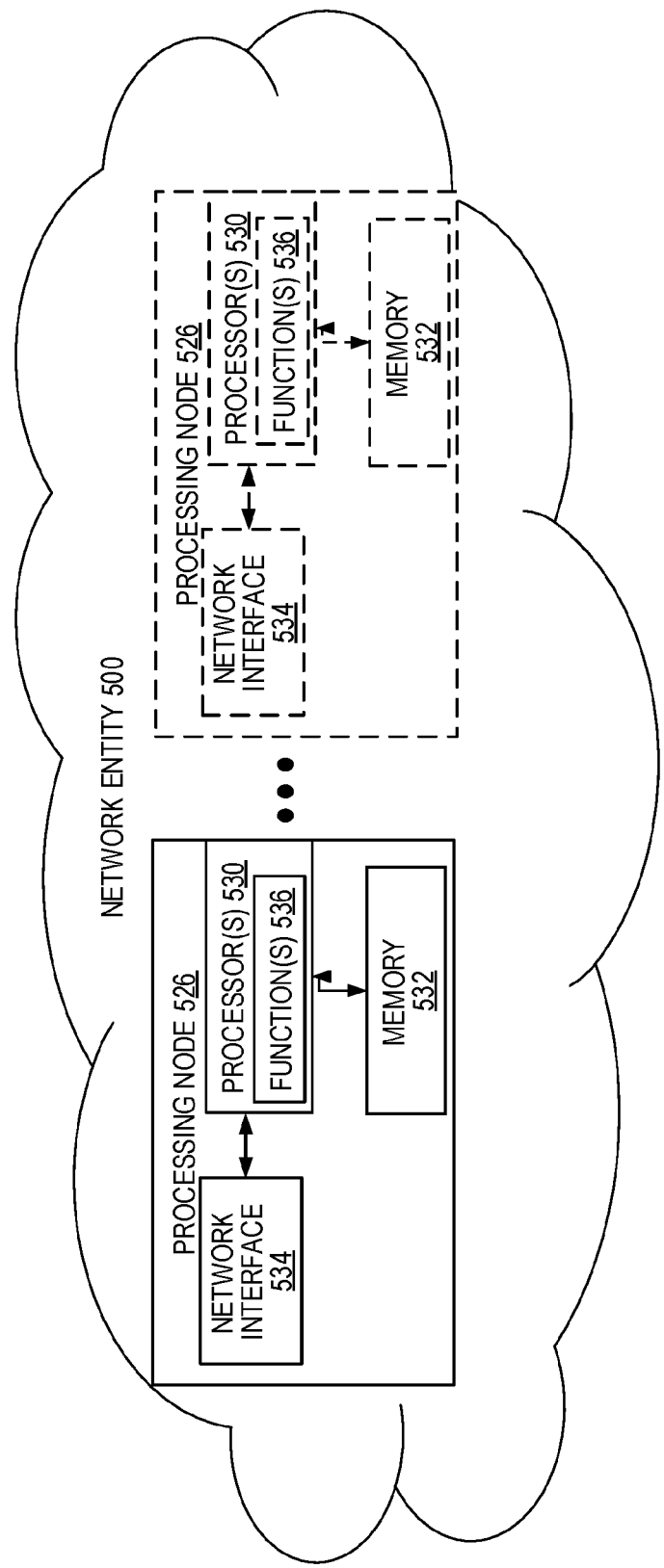

FIG. 6 is a schematic block diagram that illustrates a virtualized embodiment of the network entity 500 according to some embodiments of the present disclosure. As used herein, a "virtualized" network entity 500 is a network entity 500 in which at least a portion of the functionality of the network entity 500 is implemented as a virtual component (e.g., via a virtual machine(s) executing on a physical processing node(s) in a network(s)). As illustrated, the network entity 500 includes one or more processing nodes 526 coupled to or included as part of a network(s) 528. Each processing node 526 includes one or more processors 530 (e.g., CPUs, ASICs, DSPs, FPGAs, and/or the like), memory 532, and a network interface 534.

In this example, functions 536 of the network entity 500 whether it is the network entity in the first network or in the second network described herein are implemented at the one or more processing nodes 526 (e.g., distributed across multiple processing nodes 526) in any desired manner. In some particular embodiments, some or all of the functions 536 of the network entity 500 described herein are implemented as virtual components executed by one or more virtual machines implemented in a virtual environment(s) hosted by the processing node(s) 526.

In some embodiments, a computer program including instructions which, when executed by the at least one processor 520, 530 causes the at least one processor 520, 530 to carry out the functionality of the network entity 500 or a processing node 526 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 522, 532).

Figure 7:
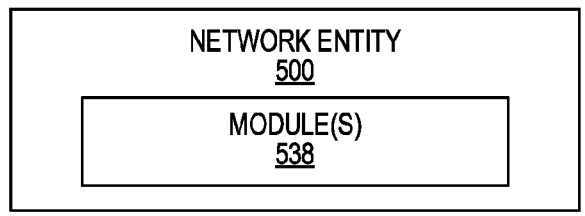

FIG. 7 is a schematic block diagram of the network entity 500 according to some other embodiments of the present disclosure. The network entity 500 includes one or more modules 538, each of which is implemented in software. The module(s) 538 provide the functionality of the network entity 500 described herein in the first network or home network and the network entity 500 in a second network, a serving network or a visited network.

Example Embodiments

While not being limited thereto, some example embodiments of the present disclosure are provided below.

1. A method of provisioning a service in a first network, the method comprising:
   Maintaining in a software repository, one or more software images (I1, I2, . . . Ii) of corresponding one or more services and where each service is identified by a service identifier (Si);
   storing configuration information related to the one or more services in a database repository in the first network.
2. The method of embodiment 1, further comprising the step of publishing a list of the one or more services.
3. The method of embodiment 2, wherein the list of the one or more services comprises associated service description for each service, and where the associated service description comprises information of associated software image and information related to associated service trigger.
4. The method of embodiment 1 wherein the first network and the second network share roaming agreements.
5. The method of embodiment 1, wherein the first network and the second network are the same.
6. The method of embodiment 1, further comprising maintaining identical software images between the first network and the second network.
7. The method of embodiment 1, further comprising providing the configuration information related to the one or more services upon request from the second network.
8. A method for providing a service to an entity in a serving network, the method comprising:
   receiving and storing one or more software images (I1, I2, . . . ) for one or more services of a first network and where each service is identified by a service identifier (Si); and
   upon detecting a trigger indicating a request for a service of the one or more services, instantiating the software image of the service in the serving network.
9. The method of embodiment 8, further comprising receiving a list of the one or more service identifiers of home services as published by the first network.
10. The method of embodiment 9, wherein the list of the one or more services comprises associated service description for each service, and where the associated service description comprises information of associated software image and information related to associated service trigger.
11. The method of embodiment 8, wherein storing the one or more software images further comprises applying local modifications to the one or more software images and storing the one or more software images as modified in a local repository.
12. The method of embodiment 11 wherein the local modifications comprise adaptation to a special hardware used in the serving network.
13. The method of embodiment 8 further comprises retrieving from the first network up-to-date configuration data for the instantiated software image of the service.
14. The method of embodiment 8 further comprising removing the software instance for the service once the service as requested is provided.
15. The method of embodiment 8, wherein the serving network is a visited network and the first network is a home network of a user for which the service is instantiated.
16. The method of embodiment 8 and 10, wherein receiving the one or more software images is in response to sending a request to a software repository wherein the request is sent to an address provided in the information of the associated software image published by the first network.
17. A computer program comprising instructions which, when executed on at least one processor, cause the at least one processor to carry out the method according to any one of embodiments 1 to 16.
18. A carrier containing the computer program of embodiment 17, wherein the carrier is one of an electronic signal, an optical signal, a radio signal, or a computer readable storage medium.
19. An entity in a first network (201) adapted to perform the method of any one of embodiments 1 to 7.

20. An entity in a first network (210) comprising:
   a network interface;
   one or more processors; and
   memory comprising instructions executable by the one or more processors whereby the entity is operable to perform the method of any one of embodiments 1 to 7.
21. The entity of the first network (210) of embodiment 20 wherein the entity is a network function repository entity, NRF.
22. An entity in a first network (210) comprising:
   one or more modules operable to perform the method of any one of embodiments 1 to 7.
23. An entity of a serving network (220) adapted to perform the method of any one of embodiments 8 to 16.
24. An entity of a serving network (220) comprising:
   a network interface;
   one or more processors; and
   memory comprising instructions executable by the one or more processors whereby the entity is operable to perform the method of any one of embodiments 8 to 16.
25. The entity of embodiment 24 wherein the entity is a node implementing network function repository entity, NRF.
26. An entity of a serving network (220) comprising:
   one or more modules operable to perform the method of any one of embodiments 8 to 16.

The following acronyms are used throughout this disclosure.

3GPP Third Generation Partnership Project
5G Fifth Generation
AAA Authentication, Authorization, and Accounting
AMF Authentication Management Function
AN Access Network
AUSF Authentication Server Function
COAP Constrained Application Protocol
CPU Central Processing Unit
DHCP Dynamic Host Control Protocol
DSP Digital Processor
IP Internet Protocol
MME Mobility Management Entity
PCF Policy Control function
QoS Quality of Service
RAN Radio Access Network
RFC Request for Comments
SBA Service-Based Architecture
SMF Session Management Function
TS Technical Specification
UE User Equipment Those skilled in the art will recognize improvements and modifications to the embodiments of the present disclosure. All such improvements and modifications are considered within the scope of the concepts disclosed herein.

The invention claimed is:

1. A method for providing a service by an entity in a serving network, the method comprising:
   receiving from a software repository one or more software images ($I1, I2, \ldots$) for one or more services of a first network and where each service is identified by a service identifier ($Si$);
   storing by the entity in the serving network the received one or more software images ($I1, I2, \ldots$); and
   upon detecting an event indicating a request for a service to be provided for a user Equipment of the first network, the service corresponding to one of the one or more services of the first network, triggering instantiation in the serving network of the corresponding stored software image of the service.

2. The method of claim 1, further comprising receiving a list of one or more service identifiers identifying respectively the one or more services as published by the first network.

3. The method of claim 2, wherein the list of the one or more services comprises associated service description for each service, and where the associated service description comprises information related to associated software image and information related to associated service trigger.

4. The method of claim 1, wherein storing the one or more software images further comprises applying local modifications to the one or more software images and storing the one or more software images as modified in a local repository.

5. The method of claim 4 wherein the local modifications comprise adaptation to a special hardware used in the serving network.

6. The method of claim 1 further comprises retrieving from the first network up-to-date configuration data for the instantiated software image of the service.

7. The method of claim 1 further comprising removing the software instance for the service once the service as requested is provided.

8. The method of claim 1, wherein the serving network is a visited network and the first network is a home network of a user for which the service is instantiated.

9. The method of claim 1, wherein receiving the one or more software images is in response to sending a request to the software repository wherein the request is sent to an address provided in the information related to the associated software image published by the first network.

* * * * *